(No Model.)
E. W. CLARK.
FISH GRAPPLE.
No. 321,796. Patented July 7, 1885.
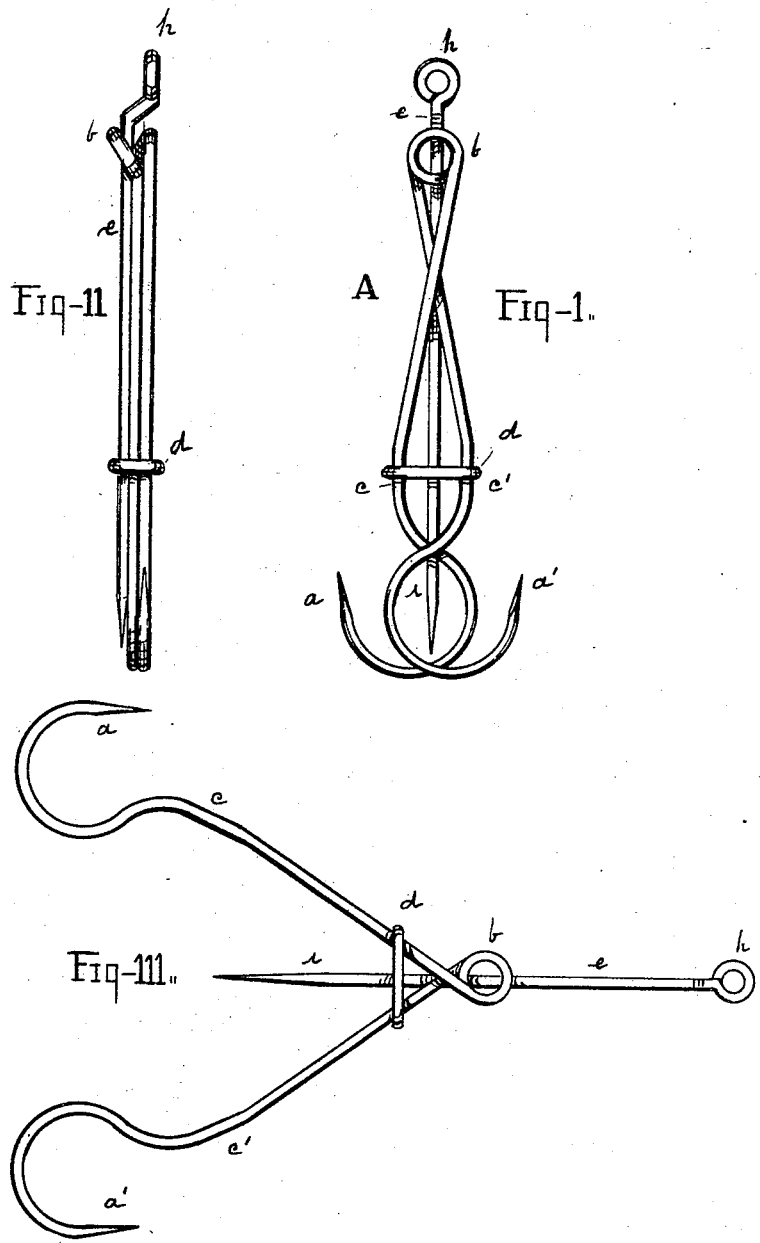
Witnesses.
Frank S. Hussey.
Roswell T. Smith
Inventor.
Edw. W. Clark

UNITED STATES PATENT OFFICE.

EMRI W. CLARK, OF NASHUA, NEW HAMPSHIRE.

FISH-GRAPPLE.

SPECIFICATION forming part of Letters Patent No. 321,796, dated July 7, 1885.

Application filed December 3, 1884. (No model.)

*To all whom it may concern:*

Be it known that I, EMRI W. CLARK, a citizen of the United States, residing at Nashua, county of Hillsborough, State of New Hampshire, have invented a new and useful Fish-Grapple, of which the following is a specification.

My invention relates to a fish-grapple, in which the hooks are held in a central position by a slide-loop until the fish has taken the bait, when the slide is raised upon the arms of the grapple by the fish drawing upon the hooks, or by the fisherman drawing upon the line, when the hooks are thrown forcibly apart and the fish is securely held. I have attained those objects by the mechanism illustrated in the accompanying drawings, in which—

Figure I is a front view. Fig. II is a side view; Fig. III, a front view of the grapple with the slide raised, so as to allow the hooks to assume their normal position.

Similar letters refer to similar parts throughout the several views.

My device consists of a piece of spring-steel wire, A, sharpened at its two ends, $a$ $a'$, and bent at its center into a coil of one or more loops, $b$, to give greater spring or elasticity to the grapple, and to provide a support and guide to the rod $e$, after which the end portions of the wire are bent laterally in reverse directions to an angle of about forty-five degrees from a center line into essentially the form shown in Fig. 3, and each of the two ends is shaped into a hook with its point extending outward or from the center. Between the hooks and the loop $b$, but nearer to the hooks, a portion, $c$ $c'$, of the wire of each arm of the grapple is so bent that when the slide $d$ is pushed down, so as to hold the hooks together, those portions are parallel. This prevents the slide from being acted upon by the tension of the springs, which, but for this, would have a tendency to slide up upon the arms.

The slide $d$ consists of a wire bent so as to inclose the arms of the grapple, and so small as to hold them close together when moved down to their parallel parts $c$ $c'$, thereby bringing the hooks so as to occupy the smallest space.

Projecting from the slide upward is the rod $e$, which passes through the central spring-loop, $b$, and its upper end, after it has passed the loop, is formed into an eye, $h$, to which the fish-line is attached. This rod slides freely up and down through the spring-loop $b$, and by its action governs the relative position of the slide $d$ to the rest of the grapple, and as this rod is secured to the slide and passes through the spring-loop $b$, the grapple cannot be detached from it.

Projecting downward from the slide $d$ is the spear $i$, which is a sharp wire intended to penetrate the bait, and prevent its removal from the hook. This spear being connected to the slide rises with it when the arms of the grapple are released.

In using my invention, after I have secured the grapple to a proper line I place the bait upon one of the hooks. I then bring the hooks together, and push the slide down upon the parallel places on the arms, when the spear pierces the bait and the grapple is ready for use. I cast it into the water as I would an ordinary fish-hook, and when the fish has seized it and swallowed the bait and draws upon the line the slide will slip upon the arms, the hooks will separate, and the force of the spring will make it impossible for the fish to free itself.

The place $c$ $c'$ on the arms of the grapple where the slide rests when the hooks are held together, may be of any form required to give the desired resistance to the upward moving of the slide.

In place of the rod $e$, I may use a cord of gut, silk, or linen, or I can pass the fish-line through the spring-loop $b$, and secure it directly to the slide; but I prefer to use the rod, because when I have secured the fish I can by pushing the rod down draw the hooks together, and so more readily remove the grapple from its mouth.

What I claim is—

An expansible fish-hook, which comprises in its construction a single length of wire having hooked ends and coiled to form a coil-spring, $b$, central of its length, in combination with a compressing-slide, $d$, having a rod, $e$, above the slide for attachment of the line, and a spear, $i$, below the slide to penetrate the bait, said rod and spear being attached to and moving with the slide, substantially as described.

EMRI W. CLARK.

Witnesses:
ROSWELL T. SMITH,
FRANK S. HUSSEY.